United States Patent
Van De Sluis et al.

(10) Patent No.: US 9,474,130 B2
(45) Date of Patent: Oct. 18, 2016

(54) METHODS AND APPARATUS FOR APPLYING LIGHTING TO AN OBJECT

(71) Applicant: KONINKLIJKE PHILIPS N.V., Eindhoven (NL)

(72) Inventors: Bartel Marinus Van De Sluis, Eindhoven (NL); Tatiana Aleksandrovna Lashina, Eindhoven (NL); Philip Steven Newton, Waalre (NL); Dzmitry Viktorovich Aliakseyeu, Eindhoven (NL); Dirk Valentinus Rene Engelen, Heusden-Zolder (BE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 14/436,754

(22) PCT Filed: Sep. 16, 2013

(86) PCT No.: PCT/IB2013/058568
§ 371 (c)(1),
(2) Date: Apr. 17, 2015

(87) PCT Pub. No.: WO2014/060874
PCT Pub. Date: Apr. 24, 2014

(65) Prior Publication Data
US 2016/0183350 A1    Jun. 23, 2016

Related U.S. Application Data

(60) Provisional application No. 61/714,919, filed on Oct. 17, 2012.

(51) Int. Cl.
*H05B 37/02* (2006.01)
*H05B 39/04* (2006.01)
*H05B 41/36* (2006.01)
*H05B 33/08* (2006.01)

(52) U.S. Cl.
CPC ...... *H05B 37/0227* (2013.01); *H05B 33/0854* (2013.01); *H05B 33/0863* (2013.01)

(58) Field of Classification Search
None
See application file for complete search history.

(56) References Cited

U.S. PATENT DOCUMENTS 6,016,038 A    1/2000 Mueller et al.
6,211,626 B1    4/2001 Lys et al.
(Continued)

FOREIGN PATENT DOCUMENTS

JP    2008016289 A    1/2008
WO    2007099470 A1    9/2007
(Continued)

*Primary Examiner* — Anh Tran
(74) *Attorney, Agent, or Firm* — Meenakshy Chakravorty

(57) ABSTRACT

Disclosed are methods and apparatus for lighting control. Initial lighting may be applied to an object in response to identifying presence of the object. The initial lighting may be adjusted based on a user lighting manipulation gesture made proximal to the object. Also, for example, in some embodiments a lighting system (100, 200) may be provided that includes at least one light source (164, 264), an object sensor (153, 255), a gesture sensor (156, 255), and a controller (150, 250). The controller may provide lighting having a first state in response to the object sensor initially identifying presence of the object and may adjust the lighting in correspondence with a lighting manipulation gesture sensed via the gesture sensor to achieve a second state distinct from the first state.

15 Claims, 7 Drawing Sheets

(56) References Cited

U.S. PATENT DOCUMENTS

| | | | |
|---|---|---|---|
| 8,730,035 B2 * | 5/2014 | Nagashima | H05B 37/0227 340/539.22 |
| 2006/0182346 A1 | 8/2006 | Yoda et al. | |
| 2009/0278915 A1 | 11/2009 | Kramer | |
| 2010/0259174 A1 | 10/2010 | Hou et al. | |
| 2010/0295481 A1 | 11/2010 | Van Endert et al. | |
| 2011/0158143 A1 | 6/2011 | Yun | |
| 2012/0235599 A1 | 9/2012 | Wu et al. | |
| 2013/0300316 A1 * | 11/2013 | Engel-Hall | H05B 37/02 315/307 |

FOREIGN PATENT DOCUMENTS

| | | |
|---|---|---|
| WO | 2009004539 A1 | 1/2009 |
| WO | 2009059462 A1 | 5/2009 |
| WO | 2011092609 A1 | 8/2011 |
| WO | 2011158143 A1 | 12/2011 |

* cited by examiner

METHODS AND APPARATUS FOR APPLYING LIGHTING TO AN OBJECT

CROSS-REFERENCE TO PRIOR APPLICATIONS

This application is the U.S. National Phase application under 35 U.S.C. §371 of International Application No. PCT/IB2013/058568, filed on Sep. 16, 2013, which claims the benefit of U.S. Provisional Patent Application No. 61/714,919, filed on Oct. 17, 2012. These applications are hereby incorporated by reference herein.

TECHNICAL FIELD

The present invention is directed generally to lighting control. More particularly, various inventive methods and apparatus disclosed herein relate to controlling one or more properties of light output directed at an object.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

In lighting systems, such as those that include LED-based light sources, it is desirable to have control over one or more light sources of the lighting system. For example, in a retail environment, it may be desirable to have lighting with certain parameters (e.g., color, illumination intensity, beam width, beam angle) applied to one or more areas of the environment. Direct specification during commissioning of the one or more light sources enables specification of lighting parameters for an environment. However, direct specification may suffer from one or more drawbacks such as lack of ability to fine-tune applied lighting, lack of flexibility for adapting to newly introduced objects and/or relocation of existing objects, and/or lack of tailoring of lighting parameters and/or adjustments to specific objects.

Thus, there is a need in the art to provide methods and apparatus that enable control of one or more properties of light output applied to an object and that optionally overcome one or more drawbacks of existing lighting systems.

SUMMARY

The present disclosure is directed to inventive methods and apparatus for lighting control. More particularly, various inventive methods and apparatus disclosed herein relate to controlling one or more properties of light output directed at or applied to an object. For example, in various embodiments and implementations of the invention, initial lighting is applied to an object in response to identifying presence of the object. The initial lighting may be adjusted based on a user lighting manipulation gesture made proximal to the object. Also, for example, in some embodiments a lighting system may be provided that includes at least one light source, an object sensor, a gesture sensor, and a controller. The controller may provide lighting having a first state in response to the object sensor initially identifying presence of the object and may adjust the lighting in correspondence with a lighting manipulation gesture sensed via the gesture sensor to achieve a second state distinct from the first state.

Generally, in one aspect, a method of applying lighting to an object is provided and includes the steps of: identifying presence of an object at a location; directing lighting having first properties to the location in response to identifying presence of the object at the location; entering a lighting fine-tuning mode; identifying a user lighting manipulation gesture proximal to the location when in the lighting fine-tuning mode; and adjusting at least one lighting property of the first properties of the lighting in correspondence with the lighting manipulation gesture in the lighting fine-tuning mode.

In some embodiments, the method further includes the step of identifying at least one property of the object. In some versions of those embodiments, the one lighting property is adjusted based on the property of the object. In some versions of those embodiments an adjustment rate of the lighting property is based on the property of the object. The property of the object may include at least one of size and shape and, optionally, an adjustment rate of the lighting property may be based on the size and/or shape of the object. In some versions of the embodiments where at least one property of the object is identified, an adjustment range of the lighting property is based on the property of the object. In some versions of those embodiments the adjustment range is proportional to the property of the object.

In some embodiments, the method further includes receiving a user fine-tuning input and entering the lighting fine-tuning mode in response to the user tine tuning input. In some versions of those embodiments the user fine-tuning input is a fine-tuning gesture proximal to the location.

In some embodiments, the fine-tuning mode is entered in response to identification of presence of the object at the location. In some versions of those embodiments the fine-tuning mode is active for at least a predetermined amount of time after identification of presence of the object at the location.

Generally, in another aspect, a method of applying lighting to an object is provided and includes the steps of: identifying a location of an object to be illuminated; identifying at least one property of the object; directing lighting having first properties to the location in response to identifying presence of the object at the location, wherein the first properties of the lighting are based on the property of the object; identifying a user lighting manipulation gesture; determining if the user lighting manipulation gesture corresponds to the object; and adjusting at least one lighting property of the first properties of the lighting in correspondence with the lighting manipulation gesture when it is determined the lighting manipulation gesture corresponds to the object.

In some embodiments, the one lighting property is adjusted based on the property of the object.

In some embodiments, the property of the object includes at least one of size and shape.

In some embodiments, an adjustment rate of the lighting property is based on the property of the object. In some versions of those embodiments the adjustment rate is proportional to the size of the object.

In some embodiments, an adjustment range of the lighting property is based on the property of the object.

Generally, in another aspect, a lighting system is provided and includes a controller in electrical communication with at least one light source, an object sensor, and a gesture sensor. The at least one light source generates lighting having at least one adjustable lighting property. The object sensor is configured to sense presence of an object at a location. The gesture sensor is configured to sense a lighting manipulation gesture action by a user proximal the location. The controller provides the lighting having a first state of the adjustable lighting property in response to the object sensor initially identifying presence of the object at the location. The controller adjusts the adjustable lighting property in correspondence with the lighting manipulation gesture sensed via the gesture sensor to achieve a second state distinct from the first state.

In some embodiments, the object sensor and the gesture sensor are part of a combinational object and gesture sensor.

In some embodiments, the controller is in wireless electrical communication with at least one of the light source, the object sensor, and the gesture sensor. In some versions of those embodiments the controller is in wireless electrical communication with each of the light source, the object sensor, and the gesture sensor.

As used herein for purposes of the present disclosure, the term "LED" should be understood to include any electroluminescent diode or other type of carrier injection/junction-based system that is capable of generating radiation in response to an electric signal and/or acting as a photodiode. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs).

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, etc.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The terms "lighting fixture" and "luminaire" are used interchangeably herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
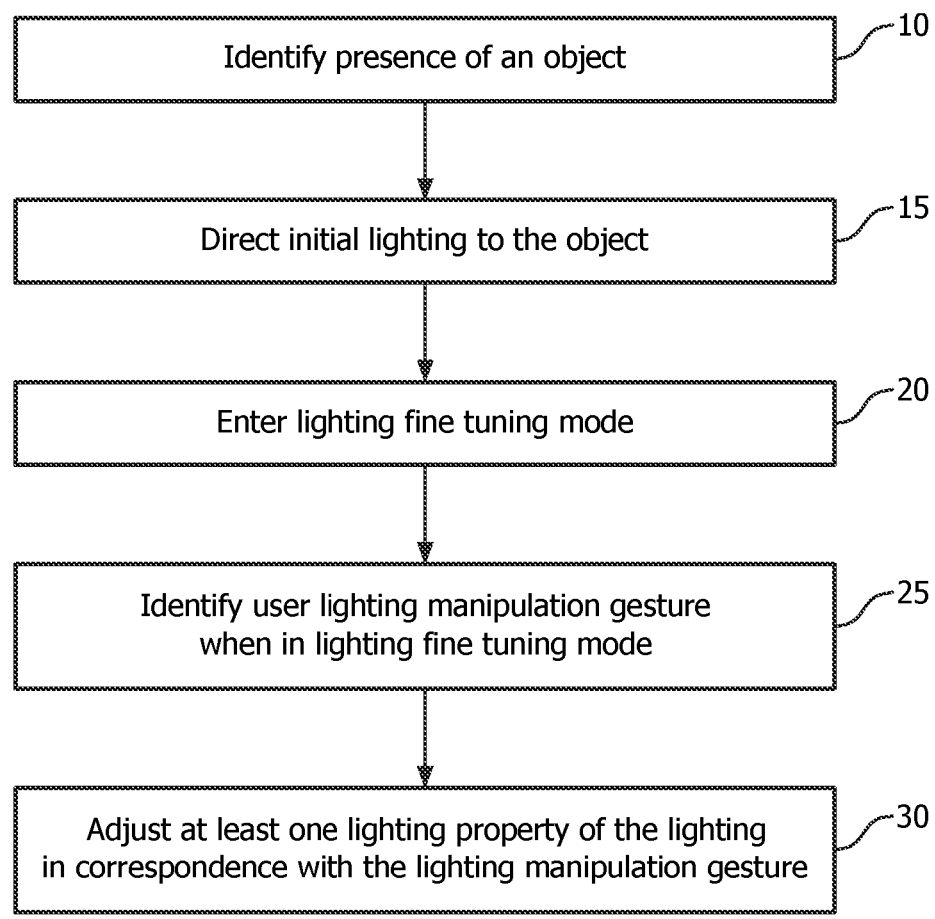
FIG. 1 illustrates a flow chart of an example method of applying lighting to an object.

In lighting systems, such as those that include LED-based light sources, it is desirable to have control over one or more light sources of the lighting system. For example, in a retail environment it may be desirable to have lighting with certain parameters (e.g., color, illumination intensity, beam width, beam angle) applied to one or more areas of the environment. Direct specification of the commissioning of the one or more light sources enables specification of lighting parameters for an environment. However, direct specification and/or control may suffer from one or more drawbacks such as lack of ability to fine-tune applied lighting, lack of flexibility for adapting to newly introduced objects and/or relocation of existing objects, and/or lack of tailoring of lighting parameters and/or adjustments to specific objects. Thus, Applicants have recognized and appreciated a need in the art to provide methods and apparatus that enable control of one or more properties of light output applied to an object and that optionally overcome one or more drawbacks of existing lighting systems.

More generally, Applicants have recognized and appreciated that it would be beneficial to provide various inventive methods and apparatus related to controlling one or more properties of light output directed at or applied to an object. In view of the foregoing, various embodiments and implementations of the present invention are directed to lighting control as described and claimed herein.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, aspects of the methods and apparatus disclosed herein are described in conjunction with a lighting system having LED-based light sources. However, one or more aspects of the methods and apparatus described herein may be implemented in other lighting systems that additionally and/or alternatively include other non-LED light sources. Implementation of the one or more aspects described herein in alternatively configured environments is contemplated without deviating from the scope or spirit of the claimed invention. Also, for example aspects of the methods and apparatus disclosed herein are described in conjunction with a single controller and single lighting unit. However, one or more aspects of the methods and apparatus described herein may be implemented in other lighting systems that may include multiple controllers and/or multiple lighting units. For example, a single centralized controller may receive sensor input from multiple sensors scattered throughout an environment and control multiple lighting units also scattered throughout the environment based on the received sensor input.

Figure 2:
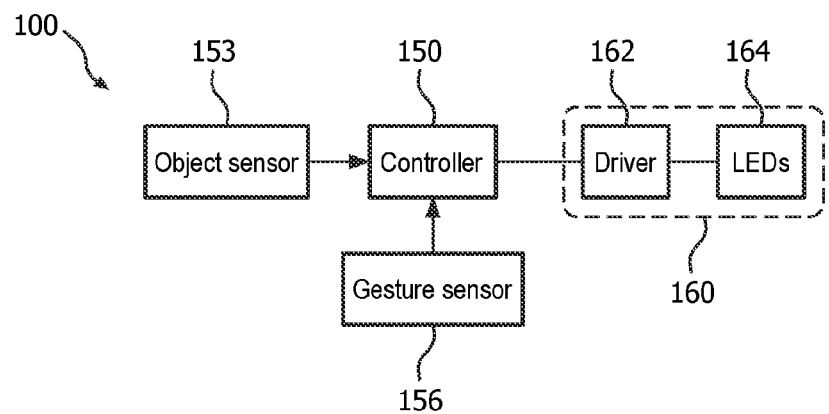
FIG. 2 illustrates a block diagram of an embodiment of a LED-based lighting system for applying lighting to an object; the LED-based lighting system has an object sensor and a separate gesture sensor.
Figure 4:
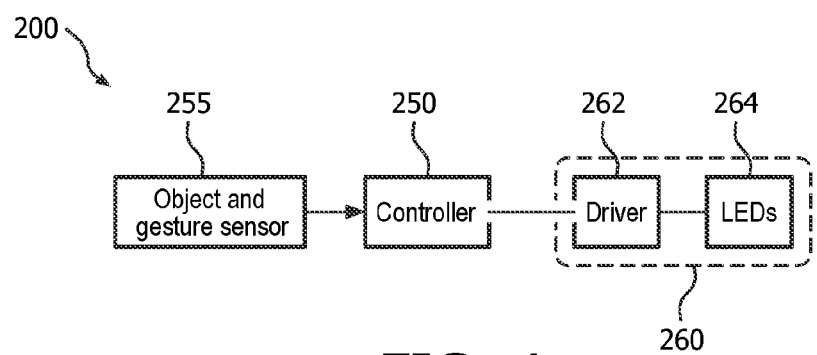
FIG. 4 illustrates a block diagram of another embodiment of a LED-based lighting system for applying light to an object; the LED-based lighting system has a combinational object sensor and gesture sensor.
Figure 5:
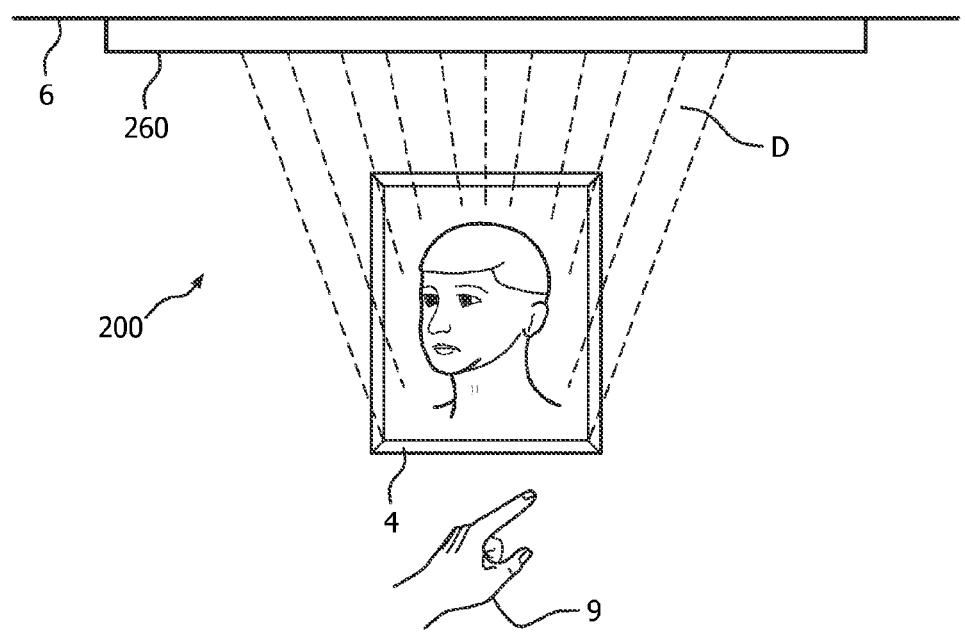
FIG. 5 illustrates the LED-based lighting system of FIG. 3 implemented in an example environment; a painting is illustrated being illuminated by the LED-based lighting system and a user's hand is illustrated positioned proximal to the painting.

FIG. 1 illustrates a flow chart of an example method of applying lighting to an object. Other implementations may perform the steps in a different order, omit certain steps, and/or perform different and/or additional steps than those illustrated in FIG. 1. For convenience, aspects of FIG. 1 will be described with reference to one or more components of a lighting system that may perform the method. The components may include, for example, one or more of the components of lighting system 100 of FIGS. 2 and 3 and/or lighting system 200 of FIGS. 4 and 5. Accordingly, for convenience, aspects of FIGS. 2-5 will be described in conjunction with FIG. 1.

The lighting system 100 includes at least one controller 150 in communication with at least one object sensor 153 and at least one gesture sensor 156. The controller 150 controls one or more LED-based lighting units 160 based on signals received from the object sensor 153 and gesture sensor 156 via interaction with a driver 162 of the LED-based lighting unit 160 that drives one or more LEDs 164 of the LED-based lighting fixture 160. In some embodiments the controller 150 may form part of the driver 162. The lighting system 200 includes at least one controller 250 in communication with at least one combinational object sensor and gesture sensor 255. The controller 250 controls one or more LED-based lighting units 260 based on signals received from combinational object sensor and gesture sensor 255 via interaction with a driver 262 of the LED-based lighting unit 260 that drives one or more LEDs 264 of the LED-based lighting unit 260. In some embodiments the controller 250 may form part of the driver 262. The gesture sensor 255 may include one or more sensors that are utilized to detect both presence of objects and user gestures.

At step 10 presence of an object is identified. For example, with reference to FIG. 3, presence of shoes 1, a watch 2, and/or a purse 3 on a display surface 10 may be identified via the object sensor 153. In some embodiments the object sensor 153 may be integrated into a display surface 110 that supports the objects 1, 2, and 3. Also, for example, with reference to FIG. 5, presence of a painting 4 on a wall 5 may be identified via object sensor and gesture sensor 255. In some embodiments object sensor and gesture sensor 255 may be integrated into the lighting unit 260 and/or positioned on a ceiling 6, wall 5, and/or other location near lighting unit 260 and/or near painting 4. In some embodiments presence of an object may be identified without regard to its particular location. For example, a single object presence sensor may monitor one defined area and a controller may utilize data from the sensor to only identify if an object is present anywhere in that area. In some embodiments, a particular location of an object may also be identified via a single presence sensor and/or analysis of data from multiple presence sensors. For example, a plurality of object sensors may each monitor a unique defined area to identify if an object is present anywhere in that area. The location of the object may be determined by a controller based on which of the sensor(s) identify presence of the object. Also, for example, a single object sensor may monitor one defined area, be utilized to identify if an object is present in that area, and be utilized to identify the particular portion of the area in which the object is present.

In some embodiments, one or more properties of the object may also be identified. For example, as described herein, in some embodiments properties such as size, shape, object type, and/or illumination preferences related to an object may be identified at step 10. For example, in some embodiments an object may be provided with a unique identifying marker (e.g., RFID tag, merchandising tag,) that may be read by the presence sensor and/or an additional sensor to identify one or more properties of the object. Also, for example, in some embodiments an image of the object may be analyzed to determine size and/or shape of the object. In some embodiments data from the object sensor 153 and/or combinational object and gesture sensor 255 may be utilized to identify the presence of an object and/or one or more properties of the object.

At step 15 initial lighting is directed to the object identified at step 10. For example, with reference to FIG. 3, lighting A from lighting unit 160 is directed to shoes 1, lighting B from lighting unit 160 is directed to watch 2, and lighting C from lighting unit 160 is directed to purse 3. Also, for example, with reference to FIG. 5, lighting D from lighting unit 260 is directed to painting 4. The lighting applied at step 15 is applied in response to identifying presence of the object at step 10 and is directed to the object so as to illuminate at least a portion of the identified object. In some embodiments the applied lighting may be tailored to a particularly determined location of the object. For example, in some embodiments one or more LEDs of an array of LEDs may be activated so as to direct light output particularly at a determined location of the object. Also, for example, in some embodiments light output from one or more light sources may be redirected so as to direct light output particularly at a determined location. In some embodiments the applied lighting may be tailored to a particular identified property of the object. For example, in some embodiments the beam width and/or illumination intensity may be tailored to the identified size of the object. Also, for example, in some embodiments which LEDs of an array of LEDs are illuminated may be tailored to the identified size of the object. Also, for example, in some embodiments the angle of applied lighting may be tailored to the identified shape of the object.

Figure 3:
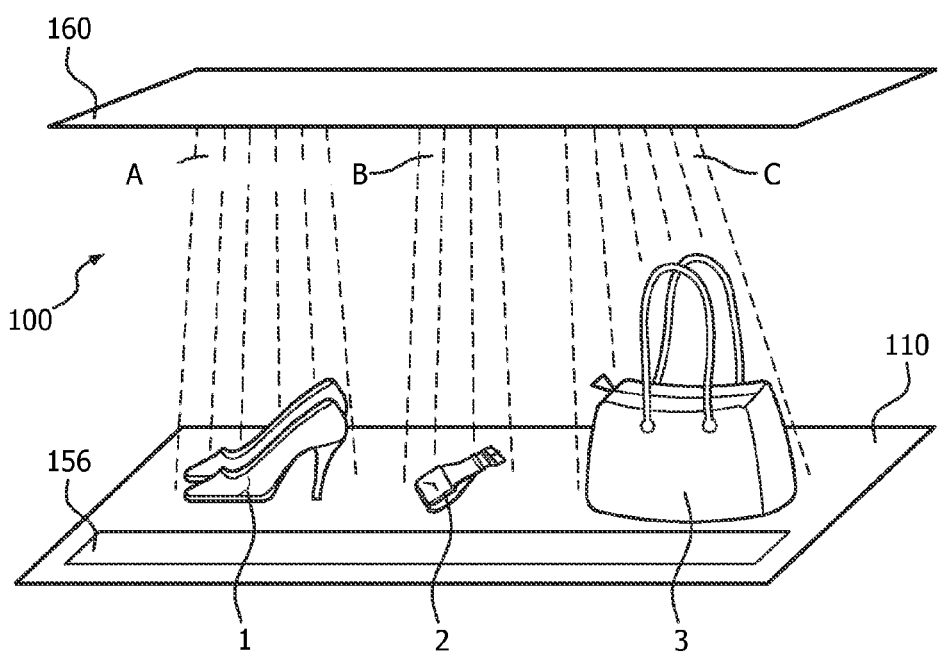
FIG. 3 illustrates the LED-based lighting system of FIG. 1 implemented in an example environment with a plurality of objects being illuminated by the LED-based lighting system.

In some embodiments, the sensors 153 and/or 255 may include one or more vision-based sensors (e.g., cameras). For example, the object sensor 153 may include one or more cameras may be directed toward display surface 110 and analysis of images and/or video from the one or more cameras may be analyzed by controller 150 to determine the location, size, shape, and or illumination preferences of objects 1, 2, and/or 3. For example, an image may be analyzed to identify the location of purse 3 and to identify that purse 3 is a hand bag. A stored preference (e.g., in a database accessible via controller 150) may be consulted to determine that the illumination preference for handbags is with angled lighting and not directly overhead lighting. As a result, angled lighting C may be directed to the purse 3 as illustrated in FIG. 3 based on the identified property of the purse 3. Also, for example, the image may be analyzed to determine an approximate size of the purse 3 and the number of LEDs 164 activated may be dependent on such determined size. In some embodiments, a comparison may be made between images of the display surface 110 without any objects and images of the display surface 110 with objects to assist in identification of presence of objects and/or identification of one or more properties of the objects.

In some embodiments, the sensors 153 and/or 255 may include a light sensor array implemented as part of the surface that supports the object. For example, in some embodiments the object sensor 153 may include an array of light sensors integrated into the display surface 10 that supports the objects 1, 2, and 3. Also, for example, in some embodiments the sensor 255 may include an array of light sensors integrated into the wall 5 that supports the painting 4. Data from the light sensors without any objects being present may be compared to data from the light sensors with objects being present to identify which light sensors are occluded by the object. One or more light sources that are directed and/or that may be directed to the occluded light sensors may then be activated to direct light to the one or more objects blocking the occluded light sensors.

For example, an upper array of LEDs 164 may be provided in LED-based lighting unit 160 over a lower array of light sensors integrated into the display area 110. The LEDs 164 may be set to a re-configuration state by a user action such as, for example, pressing a button in communication with controller 150. In the reconfiguration state, the objects 1, 2, and 3 may be removed, all of the LEDs 164 in the upper array of LEDs may be activated (simultaneously and/or sequentially), and the array of light sensors in the display area 110 may each sense a respective light level with one or more of the LEDs 164 activated. The user may then place one or more of the objects 1, 2, and/or 3 on the display area 110. The one or more objects 1, 2, and/or 3 occlude a number of light sensors, thereby causing those light sensors to sense a lower light level. This drop in sensed light level may be analyzed by controller 150 to activate one or more LEDs 164 that generate light directed at, or that may be directed at, the occluded light sensors. In some embodiments the controller 150 may consult a mapping (e.g., stored in memory associated with controller 150) between the light sensors and the LEDs 164 to determine which LED(s) 164 are directed at the occluded light sensors. In some embodiments the mapping may be generated via monitoring reactions of each light sensor to individual actuation of each of the LEDs 164 when no objects are present. The re-configuration state may then be deactivated and the appropriate LED(s) in the upper array of LEDs 164 activated to illuminate the objects 1, 2, and 3 based on the identified light sensor occlusion information. In some embodiments the light sensors may include LEDs that sense light when in an off state.

In response to such light sensors sensing they are in a blocked condition, controller 150 may communicate with one or more LEDs of upper array of LEDs 164 to request altered light output characteristics directed toward such blocked LEDs to thereby illuminate the respective object 1, 2, or 3 with such characteristics. For example, the controller 150 may communicate with one or more LEDs 164 to have them increase their light output intensity to thereby increase illumination levels on the respective object 1, 2, or 3. Also, for example, the controller 150 may communicate with one or more LEDs 164 to have them alter their light output color to thereby alter the color of light output on the respective object 1, 2, or 3. Also, for example, the controller 150 may communicate with one or more LEDs 164 to have them alter their beam width and/or beam direction. In some embodiments multiple controllers 150 may be provided, each associated with one or more of the LEDs 164. In some embodiments the size of the objects 1, 2, and/or 3 may be determined based on occluded light sensor information. For example, watch 2 may occlude less light sensors than purse 3 and it may be determined that watch 2 is smaller than purse 3. A wider distribution of light may directed toward purse 3 than watch 2 based on such a determination. For example, more LEDs 164 may be activated that are directed at purse 3 than LEDs 164 that are directed at watch 2. Data from light sensors and/or other sensors may additionally and/or alternatively be utilized to identify other properties of the objects 1, 2, and/or 3 and lighting initially applied to the objects may optionally be based on one or more of such properties. For example, shape of an object may be determined based on which of a plurality of neighboring light sensors are occluded.

In some embodiments, the sensors 153 and/or 255 may include a plurality of active ultrasonic transducers and sensors. For example, in some embodiments an array of ultrasonic transducers and sensors may be integrated into the lighting unit 160 and be generally directed toward the display surface 110. Also, for example, in some embodiments an array of light sensors may be integrated into the lighting unit 260 and/or coupled to the ceiling 6 and directed at the painting 4. The ultrasonic transducers may emit ultrasound waves and the ultrasonic sensors may pick-up reflected of the emitted waves. Data from the ultrasonic sensors may be analyzed to identify the presence and optionally location of objects. For example, time delay between an emitted signal and the received echo is a measure indicative of the distance of the reflecting surface. If objects are placed on a surface this measure indicative of distance will decrease. Shorter time delays may be indicative of an object being present. In some embodiments initial measurements may be taken without any objects being present and measurements taken after objects are present may be compared to the initial measurements to identify if one or more objects are present.

Coordination of the number and/or position of the ultrasonic sensors with the light sources may be utilized to activate certain light sources in response to certain ultrasonic sensors detecting presence of an object. For example, in some embodiments the detection area of each ultrasonic sensor will substantially coincide in area with the light output area of each LED(s) that is associated with the ultrasonic sensor. In some embodiments data from the ultrasonic sensors may be utilized to ascertain the size, shape, and/or type of the object. For example, in some embodiments the borders of an object may be identified to ascertain the size of the object and to adjust the beam width of applied lighting according to the size of the object. For example, the number of LEDs that are activated may be dependent on the identified borders of the object.

In some embodiments, the sensors 153 and/or 255 may include a magnetic sensor. For example, in some embodiments one or more magnetic sensors may be integrated into the display surface 110 and/or one or more magnetic sensors may be integrated into the wall 5. The magnetic sensor may detect electromagnetic fields. For example, an induction coil tag coupled to an object that is utilized to prevent shop lifting may be detected by the magnetic sensor when the induction coil tag is sufficiently close. Also, for example, an RFID tag coupled to an object may additionally and/or alternatively be detected by the magnetic sensor when the RFID tag is sufficiently close. Detection of a tag coupled to an object may indicate presence of the object. In some embodiments the location of the object may be particularly detected. For example, in some embodiments a plurality of magnetic sensors may be provided each corresponding to a unique area and data from such sensors analyzed to determine over which of the sensors the object is most closely placed. Also, for example, in some embodiments strength of the sensed electromagnetic field may be analyzed to determine how far away from the sensor the electromagnetic tag likely is. In some embodiments one or more properties of the object may additionally be sensed by the magnetic sensor. For example, the electromagnetic field of the tag of the product may embed product identification information that may enable the system to find associated product properties (e.g., size, shape, preferred illumination conditions) that may be utilized to create an initial lighting effect. In some embodiments transmitted signals to and/or from the controller 150 and/or controller 250 may be sent over a network. The signals may include, for example, a signal sent over a control wire and/or wireless communication signals (e.g., utilizing DMX, Ethernet, Bluetooth, ZigBee, and/or Z-Wave communication protocols). For example, signals may be sent wirelessly between the controller 150 and the object sensor 153, gesture sensor 156, and/or driver 162.

At step 20 a lighting fine-tuning mode is entered. In some embodiments the lighting fine-tuning mode may be entered in response to a user gesture within a defined user gesture area. For example, a user touch of the gesture sensor 156 provided on the display area 110 may cause the lighting fine-tuning mode to be entered for lighting system 100. In some embodiments the gesture sensor 156 may be a capacitive touch sensor. In some embodiments the gesture sensor 156 may include a plurality of light sensors that may sense occlusion of light by a user's fingers and/or hands. Such sensed occlusion data may be analyzed to determine one or more user lighting manipulation gestures. Also, for example, a user hand movement within a certain distance of the painting 4 (e.g., as illustrated by hand 9 in FIG. 5) may cause the lighting fine-tuning mode to be entered for lighting system 200. In some embodiments the object and gesture sensor 255 may include a camera and/or ultrasonic transducer and sensor that monitor for user gestures proximal to the painting 4.

In some embodiments, the fine-tuning mode may be entered in response to any user gesture. In some embodiments the fine-tuning mode may be entered in response to a specific user gesture such as a double finger tap and/or a finger snap. In some embodiments the lighting fine-tuning mode may be entered in response to another user action. For example, a voice command and/or actuation of a button in communication with the system may initiate the lighting fine-tuning mode. In some embodiments a particular authentication method may be utilized in order to change the light settings, such as, for instance, a badge with an RFID, a particular spoken command, and/or voice recognition system.

In some embodiments, the lighting fine-tuning mode may be entered automatically. For example, the lighting fine-tuning mode may be entered upon start-up of the lighting system. Also, for example, the lighting fine-tuning mode may be entered after identification of presence of an object at step 10 and/or after directing of initial lighting to the object at step 15. For example, after detecting an object, an initial light effect may be provided on the object. Then, the lighting system could enter a fine-tuning mode for a period of time during which user control gestures will be detected and associated with the identified object. The period of time can be a pre-defined amount of time (e.g., 1 minute) and/or the period of time could end if the system no longer detects gestures for a pre-defined amount of time. In some versions of those embodiments, a user may activate the fine-tuning mode again by removing the object from the detection area and then placing it back. In some embodiments the fine-tuning mode can switch off automatically. For example, the fine-tuning mode may switch off after a time period during which no gestures have been detected. In some embodiments user feedback may be provided upon starting and/or ending the fine-tuning mode (e.g., by visual and/or acoustic feedback).

At step 25 a user lighting manipulation gesture may be identified when in the lighting fine-tuning mode. For example, a user lighting manipulation gesture on the gesture sensor 156 provided on the display area 110 may be identified. The lighting manipulation gesture may include, for example, one or more of the lighting manipulation gestures described herein with respect to FIGS. 6-8B. One of ordinary skill in the art, having had the benefit of the present disclosure, will recognize and appreciate that additional and/or alternative lighting manipulation gestures may be utilized.

Also, for example, a user lighting manipulation gesture within a certain distance of the painting 4 (e.g., as illustrated by hand 9 in FIG. 5) may be identified by the object and gesture sensor 255. In some embodiments the object and gesture sensor 255 may include a camera and/or ultrasonic transducer and sensor that monitor for user gestures proximal to the painting 4. In some embodiments the identification of the gestures may be based on detecting the increasing and/or decreasing distance from the user's hands to the sensors. For example, waving with a hand up and down and/or back and forth may be recognized as gestures. In some embodiments multiple ultrasound emitters may be provided that are directed near to the detected object. The ultrasound emitters may operate at different frequencies and/or different phases. The echoes from these ultrasound emitters may be picked up by a plurality of sensors. When a user makes a gesture close to the object this will cause a frequency shift between the emitted signal and the echo sensed by the sensors. This frequency shift may be utilized as a basis for a measure of the speed of the gesture. The interference between the sensed echoes from the different emitters may be utilized as a basis for a measure of the position of the user's hands. The combination of the frequency shift and the interference may be utilized to determine the gesture. In some embodiments the ultrasound emitters and/or the sensors may be coupled to a lighting unit such as lighting unit 160 or 260. In some embodiments the ultrasound emitters and/or the sensors may be coupled to a ceiling, wall, and/or other surface. In some embodiments the ultrasound emitters and/or the sensors may detect the gestures and detect the object. For example, combination object and gesture sensor 255 may include a plurality of ultrasonic transducers and sensors that sense presence of an object and additionally sense lighting manipulation gestures.

In some embodiments, a lighting manipulation gesture may be associated with one of a plurality of detected objects. For example, the lighting manipulation gesture may be associated with the object that is closest in location to the gesture location. For example, a lighting manipulation gesture on gesture sensor 156 will be associated with the object that is closest to the location on gesture sensor 156 where the lighting manipulation gesture is made. In some embodiments a mapping between locations on the gesture sensor 156 and object sensors integrated in the display area 110 may be consulted to associate the gesture with the object. Also, for example, in some embodiments ultrasonic echoes and/or images may be analyzed to determine to which object a detected lighting manipulation gesture is closest. Also, for example, in some embodiments the gesture can be associated with the object that is located at a particular side of the gesture. For example, the gesture may be associated with the most proximal object to the right of the gesture. Also, for example, in some embodiments the gesture can be associated with the object that is located within a particular range of the gesture. For example, the gesture must be within one inch of an object to be associated with the object. In some embodiments data from both the gesture sensor and the object sensor may be utilized to associate a lighting manipulation gesture with a particular object. In some embodiments feedback may be provided to initially alert the user to which object the lighting manipulation gesture will apply. For example, upon initially detecting a user's hand in a lighting manipulation area associated with a particular object, the lighting being directed to the object may temporarily flash, change colors, dim, and/or brighten.

At step 30 at least one lighting property of the lighting directed toward the corresponding object is adjusted in correspondence with the lighting manipulation gesture. The lighting property of the lighting may be adjusted as described, for example, with one or more of the example lighting manipulation gestures described herein with respect to FIGS. 6-8B. One of ordinary skill in the art, having had the benefit of the present disclosure, will recognize and appreciate that additional and/or alternative adjustments in response to one or more gestures may be utilized. The lighting property may be adjusted relative to the initial lighting applied to the object in step 15. For example, lighting C may be applied to purse 3 of FIG. 3 at step 15 and lighting manipulation gestures may be utilized to adjust the direction, beam width, and/or color of the initially applied lighting. The lighting property may also be adjusted relative to a previously user adjusted lighting applied to the object in a previous iteration of step 30. In some embodiments the adjusted lighting property may be maintained with the object as the object is moved to other locations. For example, if a light setting is defined for an object at step 30 and a shopper subsequently moves an object to a new location, that new location and that object can be identified by the object sensor and the same light setting applied to that object at the new location. In those and other embodiments the light setting associated with a particular product may be stored in memory accessible by an associated controller.

In some embodiments, the adjustment of the lighting property may be based only on the lighting manipulation gesture. In some embodiments the adjustment of the lighting property may additionally be based on readings from additional sensors such as an ambient light sensor. In some embodiments the adjustment of the lighting property may additionally be based on one or more identified properties of the object to which the lighting is directed. For example, a relatively small object may have a slower adjustment rate than a relatively larger object. For instance, movement of an adjustment finger one inch according to a first gesture for the larger object may cause a change in the lighting property of a first magnitude and movement of the adjustment finger one inch according to the first gesture for the smaller object may cause a change in the lighting property of a second magnitude that is less than the first magnitude. As an example, a one inch finger movement to adjust beam width may increase beam width one inch for a larger object but may only increase beam width a half inch for a smaller object.

Also, for example, identification of a particular object, object type, lighting preferences, and/or size may enable cycling through a plurality of presets directed toward such particular parameters. For example, a tapping lighting manipulation gesture may be utilized to toggle through a set of predefined lighting effects that are tailored to a specific identified object type and/or object size. Also, for example, an adjustment range of the lighting property may be based on one or more identified properties of the object. For example, the maximum extent of beam width adjustment may be constrained by the size of the object. Also, for example, the range of the intensity of the lighting may be constrained by the identified object type. Also, for example, only adjustment to certain predefined colors and/or color temperatures may be allowed for a particular object type. For instance, lighting for diamond jewelry may only be adjustable within a set of ranges of color temperatures. Also, for example, only certain lighting adjustments may be available for certain object types.

Figure 6:
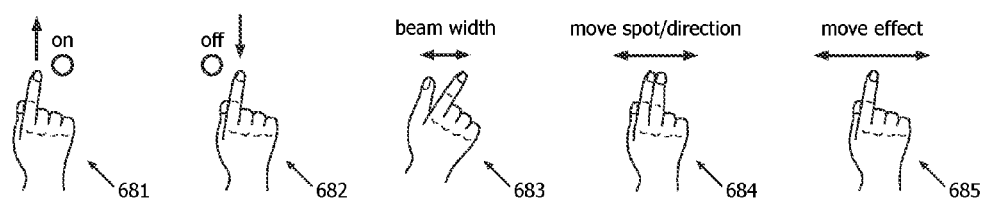
FIG. 6 illustrates a plurality of example lighting manipulation gestures that may be utilized in a LED-based lighting system to adjust lighting properties.

FIG. 6 illustrates a plurality of example lighting manipulation gestures that may be utilized in a LED-based lighting system. For example, the lighting manipulation gestures may be utilized in combination with gesture sensor 156 of lighting system 100 to adjust lighting properties of one or more of lighting A, B, and/or C. Also, for example, the lighting manipulation gestures may be utilized in combination with combinational object and gesture sensor 255 to adjust one or more properties of lighting D.

Lighting gesture 681 utilizes a single finger moving in an upward direction to turn the lighting on. Lighting gesture 682 utilizes a single finger moving in a downward direction to turn the lighting off. Lighting gesture 683 utilizes a spread gesture with two fingers spreading apart two increase beam width of the lighting. Lighting gesture 684 utilizes two fingers in fixed relation moving to the left or right to alter the angular direction of the applied lighting. Lighting gesture 685 utilizes a single finger moving to the left or right to alter the location of the applied lighting.

FIGS. 7A-F illustrate additional example lighting manipulation gestures that may be utilized to adjust lighting properties. The lighting gestures are illustrated in combination with another embodiment of a LED-based lighting system 300 for applying lighting to an object and are illustrated with a shoe 301 that is being illuminated by the LED-based lighting system 300. In some embodiments the gestures of FIGS. 7A-F may additionally and/or alternatively be applied to lighting systems 100 and/or 200.

Figure 7A:
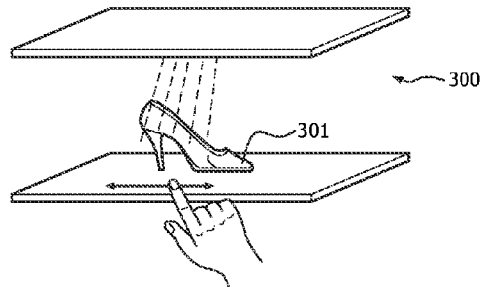
FIGS. 7A-F illustrate additional example lighting manipulation gestures that may be utilized to adjust lighting properties; the lighting gesture are illustrated in combination with another embodiment of a LED-based lighting system for applying lighting to an object and with a shoe that is being illuminated by the LED-based lighting system.
Figure 7B:
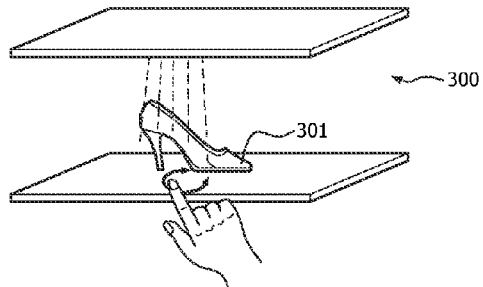
Figure 7C:
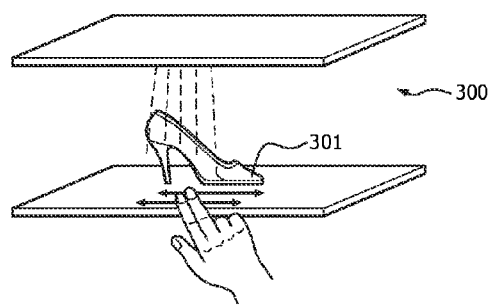
Figure 7D:
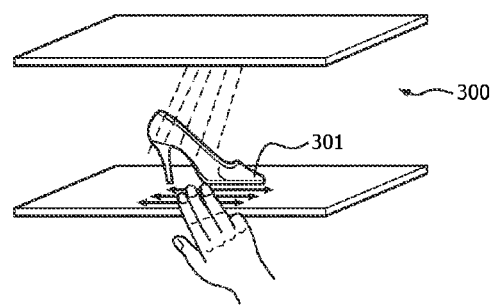
Figure 7E:
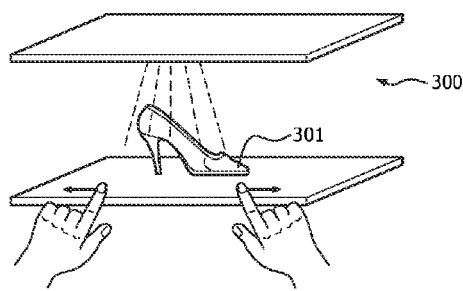
Figure 7F:
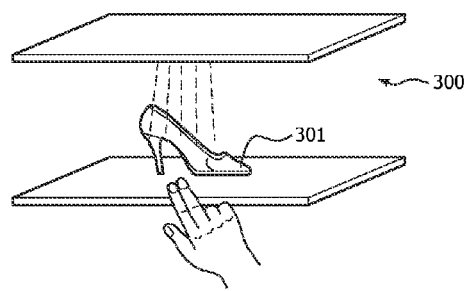

The lighting gesture of FIG. 7A utilizes a single finger movement to the left or right to increase (one direction) or decrease (the other direction) the brightness/light effect intensity. The lighting gesture of FIG. 7B utilizes a single finger circular movement to increase (one direction) or decrease (the other direction) the brightness/light effect intensity. The lighting gesture of FIG. 7C utilizes a double finger movement to move the location of the light beam to the left (one direction) and/or the right (the other direction). The lighting gesture of FIG. 7D utilizes a double finger spread gesture to increase the beam width of the lighting. In some embodiments a double finger pinch gesture may be utilized to decrease the beam width of the lighting. The lighting gesture of FIG. 7E utilizes two fingers held in one location for at least a predetermined amount of time (e.g., one second) to recall a lighting preset and/or to cycle through a plurality of lighting presets.

In some embodiments, lighting manipulation gestures may additionally and/or alternatively be based on an "anchor and adjustment" approach. For example, the first detected (and static) gesture is an anchor to the light effect (e.g., put a finger on a gesture sensing surface, close to the light effect). The second detected gesture is used as a relative modifier relative to the anchor (e.g., a second finger on the surface may be moved relative to the first finger). For example, moving the modifier finger only, while maintaining the anchor finger, may change the intensity of the lighting. Also, for example, moving both the anchor and modifier, while substantially maintaining the relative distance between the two, may change the location of the lighting. Also, for example, moving both the anchor and modifier, while changing the relative distance between the two, may change the width of the light effect. Also, for example, moving the anchor and keeping the modifier may change the angular direction of the lighting. Also, for example, moving the modifier in a circular direction and keeping the anchor substantially stationary may change the color and/or color temperature of the lighting.

Figure 8A:
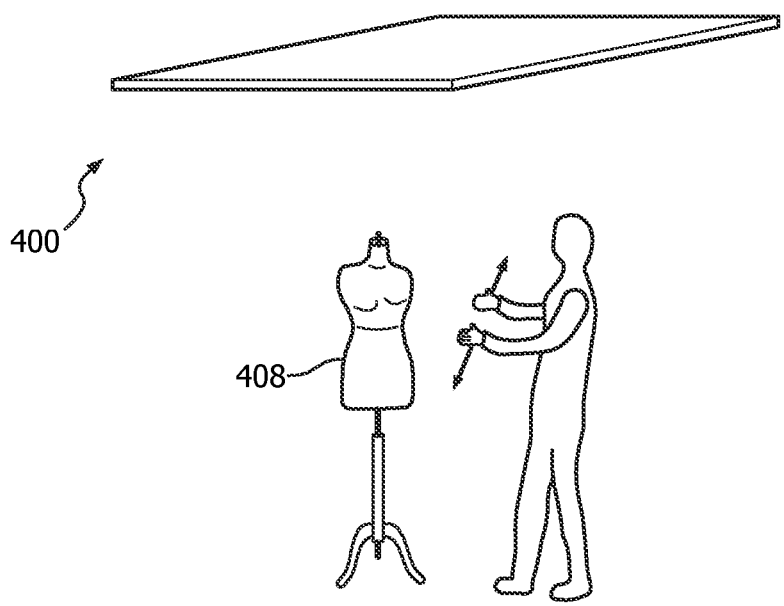
FIGS. 8A and 8B illustrate additional example lighting manipulation gestures that may be utilized to adjust lighting properties; the lighting gesture are illustrated in combination with another embodiment of a LED-based lighting system for applying lighting to an object and with a mannequin that is being illuminated by the LED-based lighting system.
Figure 8B:
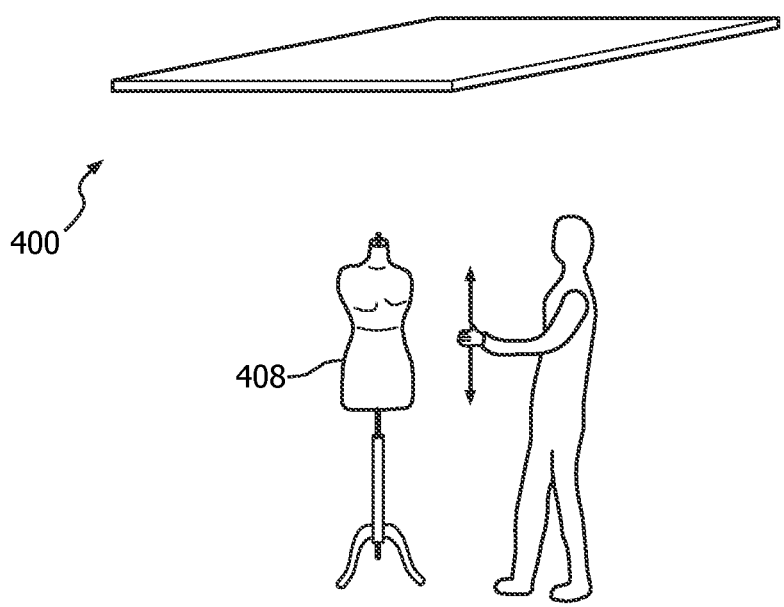

FIGS. 8A and 8B illustrate additional example lighting manipulation gestures that may be utilized to adjust lighting properties. The lighting gesture are illustrated in combination with another embodiment of a LED-based lighting system 400 for applying light to an object and with a mannequin 408 that is being illuminated by the LED-based lighting system 400. In some embodiments the gestures of FIGS. 8A and/or 8B may additionally and/or alternatively be applied to lighting systems 100 and/or 200.

In the lighting system 400, local light effects are created from a ceiling lighting infrastructure, based on object detection of floor standing objects such as mannequins 408 in a shop or shop window, sculptures and artworks in a museum, or local light effects associated with moving actors on a theatre stage. For example, an object sensor may detect the presence and location of mannequin 408 and apply an initial lighting to the mannequin 408. Complete hand and/or arm movements may be utilized to adjust specific parameters of the applied lighting. For example, moving hands up and down as illustrated in FIG. 8B can control the light intensity, whereas moving two hands from or to each other as illustrated in FIG. 8A can control the desired beam width. Also, for example, finger-gestures may be used to select specific presets (e.g., holding up one finger for selecting preset 1, two fingers for preset 2). The gestures may be detected via a gesture sensor such as, for example, a camera and/or a plurality of ultrasonic transducers and sensors.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited. Any reference numerals appearing between parentheses in the claims, if any, are provided merely for convenience and should not be construed as limiting in any way.

The invention claimed is:

1. A method of applying lighting to an object, comprising:
identifying presence of an inanimate object at a location;
directing lighting having first properties to said location in response to identifying presence of said object at said location;
entering, based at least in part on identifying presence of said object at said location, a lighting fine-tuning mode during which lighting manipulation gestures adjust said lighting;
identifying a user lighting manipulation gesture proximal to said location when in said lighting fine-tuning mode, said lighting manipulation gesture including one or more movements of a user and being independent of any movement of said object; and
adjusting at least one lighting property of said first properties of said lighting in correspondence with said lighting manipulation gesture in said lighting fine-tuning mode.

2. The method of claim 1, further comprising identifying at least one property of said object.

3. The method of claim 2, wherein said one lighting property is adjusted based on said property of said object.

4. The method of claim 3, wherein an adjustment rate of said lighting property is based on said property of said object.

5. The method of claim 3, wherein said property of said object includes at least one of size and shape.

6. The method of claim 5, wherein an adjustment rate of said lighting property is based on said size of said object.

7. The method of claim 3, wherein an adjustment range of said lighting property is based on said property of said object.

8. The method of claim 7, wherein said adjustment range is proportional to said property of said object.

9. The method of claim 1, further comprising receiving a user fine-tuning input and entering said lighting fine-tuning mode in response to said user fine-tuning input.

10. The method of claim 9, wherein said user fine-tuning input is a fine-tuning gesture proximal to said location.

11. The method of claim 1, wherein said fine-tuning mode is entered in response to identification of presence of said object at said location.

12. The method of claim 11, wherein said fine-tuning mode is active for at least a predetermined amount of time after identification of presence of said object at said location.

13. The method of claim 1, wherein identifying said presence of said object is based on input of a first sensor and is independent of input of a second sensor, and wherein identifying said user lighting manipulation gesture is based on input of said second sensor and is independent of input of said first sensor.

14. The method of claim 1, further comprising:
identifying at least one property of said object; and
determining said first properties of said lighting based on said property of said object.

15. The method of claim 1, further comprising:
determining said user lighting manipulation gesture corresponds to said object;
wherein adjusting said lighting property of said lighting is based on determining said user lighting manipulation gesture corresponds to said object.

* * * * *